(12) United States Patent
Maslen et al.

(10) Patent No.: US 8,408,916 B2
(45) Date of Patent: Apr. 2, 2013

(54) SHORT-VOWEL INTRINSIC-SOUND LEARNING SYSTEM

(76) Inventors: Bobby Lynn Maslen, Portland, OR (US); John Maslen, Portland, OR (US); Jon M. Dickinson, Portland, OR (US)

( * ) Notice: Subject to any disclaimer, the term of this patent is extended or adjusted under 35 U.S.C. 154(b) by 1471 days.

(21) Appl. No.: 11/588,772

(22) Filed: Oct. 27, 2006

(65) Prior Publication Data

US 2007/0105074 A1    May 10, 2007

Related U.S. Application Data

(60) Provisional application No. 60/733,578, filed on Nov. 4, 2005.

(51) Int. Cl.
*G09B 1/00* (2006.01)
(52) U.S. Cl. .................... 434/174; 434/172; 434/167
(58) Field of Classification Search .................. 434/167, 434/174, 402, 404, 405, 427, 156, 172
See application file for complete search history.

(56) References Cited

U.S. PATENT DOCUMENTS

| | | | |
|---|---|---|---|
| 270,511 A * | 1/1883 | Thomson | 434/174 |
| 1,285,038 A * | 11/1918 | Chance | 434/172 |
| 4,389,193 A * | 6/1983 | Phillips | 434/174 |
| 4,643,680 A * | 2/1987 | Hill | 434/170 |
| 4,776,802 A * | 10/1988 | Rind et al. | 434/345 |
| 6,358,059 B1 * | 3/2002 | Li | 434/402 |
| 6,869,286 B2 * | 3/2005 | Furry | 434/167 |
| 2002/0132218 A1* | 9/2002 | White | 434/402 |

* cited by examiner

*Primary Examiner* — Xuan Thai
*Assistant Examiner* — Peter Egloff
(74) *Attorney, Agent, or Firm* — Jon M. Dickinson, Esq.; Robert D. Varitz, Esq.

(57) ABSTRACT

A system for teaching plural, different, short-vowel sounds, in their intrinsic forms, in the context of associated short-vowel-sound words. The system incorporates, for each such sound, an associated pair of relatively rotatable, foreground and background word-fragment carriers—the former in each pair carrying but a single, first-category, readable, word-ending word fragment having within it the vowel whose sound is associated with the carrier pair, and the latter in each pair carrying a plurality of second-category, readable, word-beginning word fragments, each dedicated to working in teaching cooperation with the single word fragment carried on the associated foreground carrier to combine readably with that first-category word fragment to form a complete, short-vowel-sound word which is correctly pronounceable utilizing the associated short-vowel sound. All word-beginning word fragments end with the same, common consonant.

4 Claims, 4 Drawing Sheets

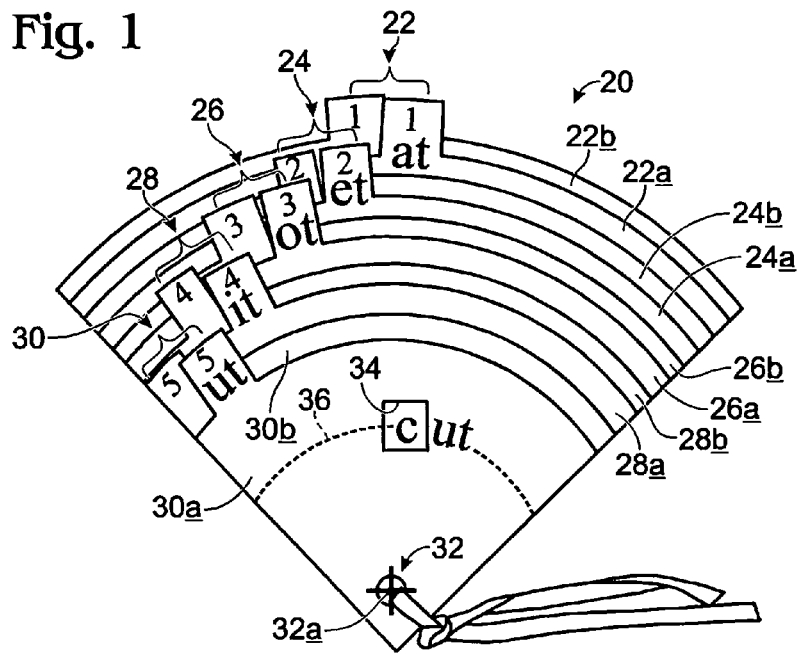
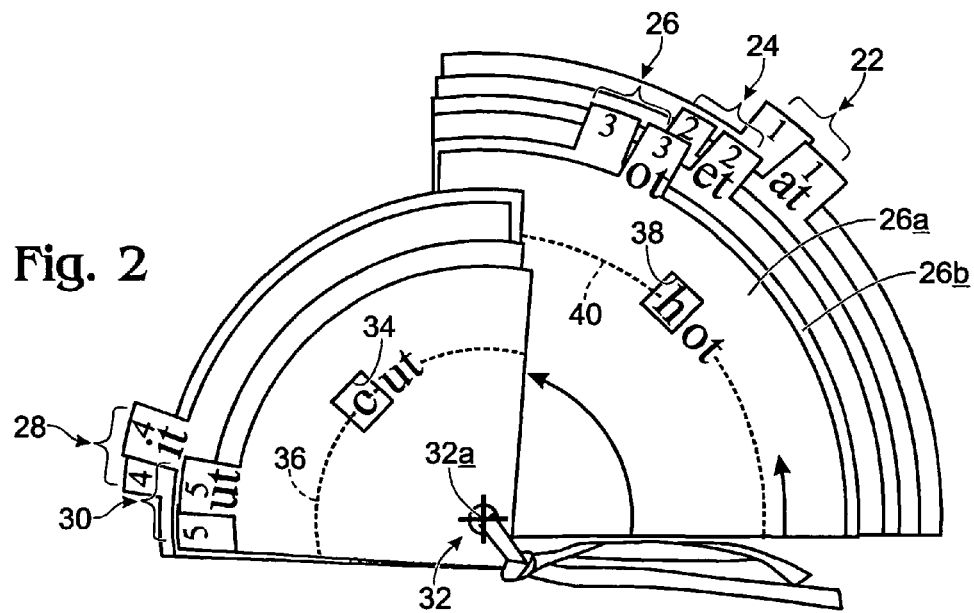

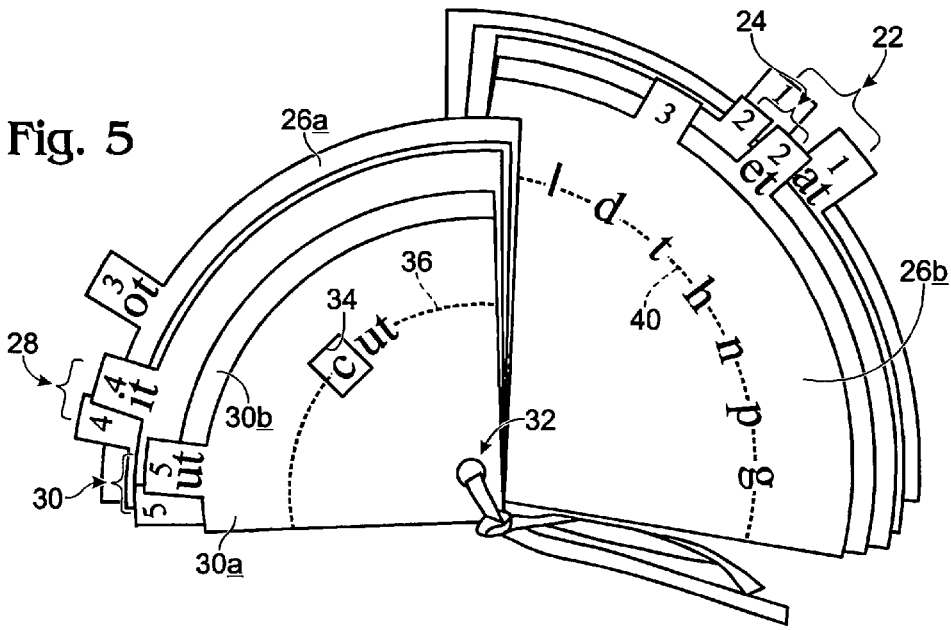
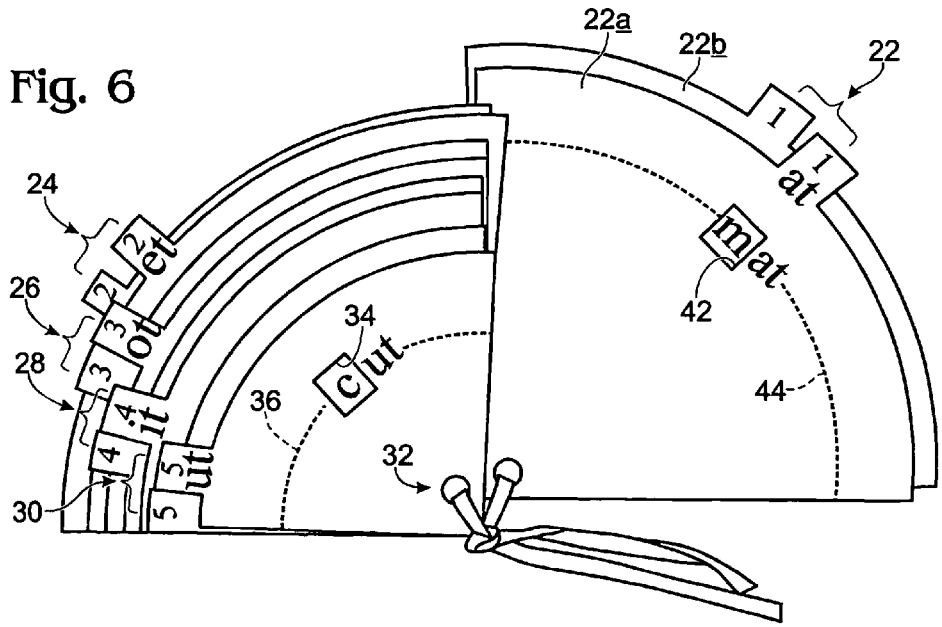

SHORT-VOWEL INTRINSIC-SOUND LEARNING SYSTEM

CROSS REFERENCE TO RELATED APPLICATION

This application claims priority to U.S. Provisional Patent Application Ser. No. 60/733,578, filed Nov. 4, 2005, for "Learning Machine System and Methodology". The entire disclosure content of that prior-filed provisional application is hereby incorporated herein by reference.

BACKGROUND AND SUMMARY OF THE INVENTION

This invention pertains to a system, such as an early learning system, for teaching the correct, per se (i.e., intrinsic), pronunciations (sounds) of the plural, different, short-vowel sounds, implemented, for each different vowel, in the context of associated, short-vowel-sound-based words all ending in a common consonant. The system utilizes selective, relative-rotational motion between associated, specific, operatively connected, short-vowel-sound-dedicated pairs of foreground and background carriers which carry, respectively, readably assembleable word-ending and word-beginning word-fragments. In particular, these carriers, which may be either mechanically real, or virtual, in each pair, carry, as just suggested, short, word-ending and word-beginning, assembleable portions of a plurality of same-vowel-sound-employing simple words (such as simple, three-letter words), which word-fragment portions may be "brought together physically readably" for full-word formation (a full-learning element) in readable (visual or tactile, e.g., Braille) paired juxtaposition.

A preferred embodiment and manner of practicing the invention are described herein, for illustration purposes, in conjunction with early learning by young children of the various "short" sounds of the basic vowels in the English language, with these vowels being presented in the contexts of formable, simple, three-letter words which are combined with appropriate consonants. This embodiment of the invention may be designed to work collaboratively with other early-learning tools, such as with basic reading books, which may include supportive content directly related to use of the present invention.

This and all embodiments of the invention may be implemented either in a fully mechanical manner, or in a substantially fully virtual, computer-based manner. Both of these manners are illustrated and described herein, with principal focus being placed upon a manual implementation of the invention which has been found to be especially useful.

An interesting feature of the invention, which results from the way in which the structural aspect of it is configured and utilized, is that the invention provides young learners with elements of surprise and mystery, coupled with just plain fun, in the putting of the system "through its paces"—all in the context of providing such learners with a solid and very unique findamental learning experience.

The various important features and advantages which are offered by the present invention will become more fully apparent now as the description of the invention which follows below is read in conjunction with the accompanying drawings.

DESCRIPTION OF THE DRAWINGS

FIGS. 1-8, inclusive, are photocopy images of an actual, prototype, mechanical, system device, or machine, made in accordance with a preferred mechanical embodiment of the present invention, designed to teach young learners both the short-form pronuncations of the five English vowels, and also to teach those pronunciations in the contexts of a collection of basic three-letter words suitable for early reading learning.

DETAILED DESCRIPTION OF THE INVENTION

Figure 3:
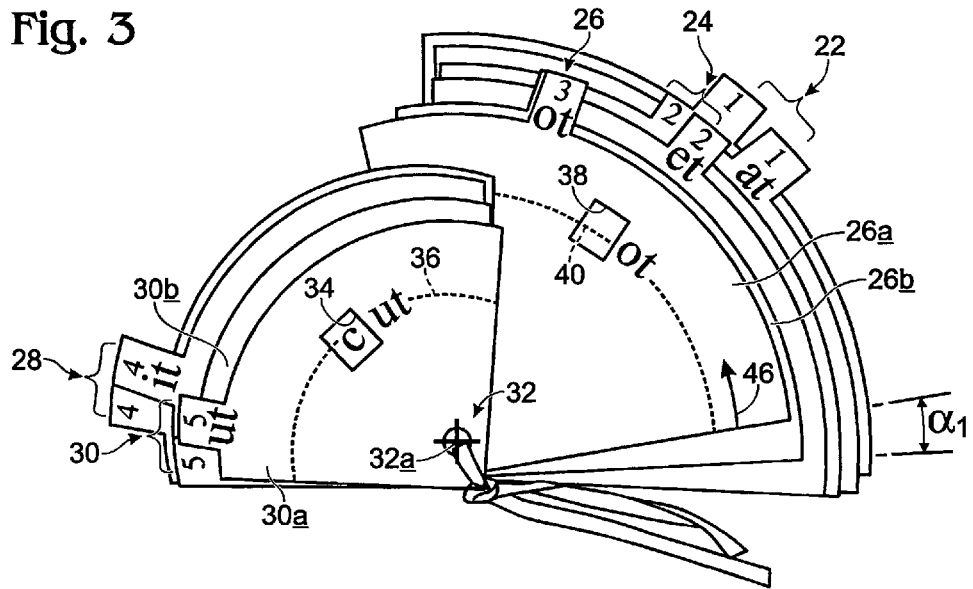

The teaching of young learners in an early-learning mode directed at word and vowel recognition and reading, accompanied by correct pronunciation, has been approached over the years in a number of progressively more sophisticated ways. The embodiment of the invention in mechanical form which is pictured, for illustration purposes herein, in FIGS. 1-8, inclusive, is designed, in the contexts of a selected plurality of three-letter words, to teach correct pronunciation of what are known as the short forms, or sounds, of the five, basic English vowels, presented, ultimately, to an early learner in the forms of simple, three-letter words, including various consonants linked to these vowels.

As was mentioned above herein with regard to the descriptions of the several drawing figures, FIGS. 1-8, inclusive, illustrate a very simple and useful mechanical, manually-manipulable systemic teaching structure, also called both a mechanical moving-parts device and a system for teaching plural, different, selected short-vowel sounds, which has been found to work especially well with young children.

Looking now very specifically at the contents of FIGS. 1-8, inclusive, a manually-manipulable short-vowel-sound teaching machine/system is illustrated generally at 20. In FIG. 1, machine 20 is shown in what will soon be understood to be a fully collapsed condition, ready for use. In the other seven figures, the same machine is shown in different states of use-adjustment which are representative of actual use "conditions" of this machine.

Machine 20, which will now be referred to herein simply as device 20, includes five, learning-associated, cooperative, dedicated pairs 22, 24 26, 28, 30 (shown bracketed) of substantially, parallel-planar, card-like, front-and-back (foreground and background) adjacent, printed, word-fragment carriers (or elements) of what are referred to herein as vowel-sound associated, partial-learning-elements units (printed on these carriers, and also referred to herein as readable word fragments). Each pair of carriers which, in accordance with the invention, is specifically associated (in each pair) with a particular short vowel sound, includes foreground and background carriers, such as foreground carriers 22$a$, 24$a$, 26$a$, 28$a$, 30$a$ in pairs 22, 24, 26, 28, 30, respectively, and background carriers 22$b$, 24$b$, 26$b$, 28$b$, 30$b$ in these same respective pairs of carriers. As will be evident from the description of device 20 given so far herein, the individual carriers in each pair of carriers, also referred to herein as a learning-information carriers, are provided with outwardly projecting manual-manipulation tabs, numbered 1, 2, 3, 4, and 5 for carriers 22, 24, 26, 28, 30, respectively. As will be seen, the carriers in each pair operate, under all circumstances, cooperatively with one another.

In the specific device 20 which is shown herein, and as briefly suggested just above, each of the mentioned carriers is conveniently formed of a thin and planar card-like structure to have the perimetral shape of a quadrant-sector of a circle, with each of these carriers having a different radial dimension, and with all of the carriers being pivoted to one another at 32 for relative angular (rotational) shifting, generally in the planes of FIGS. 1-8, inclusive, about a common, or shared, axis which is shown at 32*a*—an axis which is substantially normal to the planes of these eight drawing figures. In the prototype device which has been photocopied to create FIGS. 1-8, inclusive, a ribbon 33*a* extends through eyelets 33*b* which are anchored near the "radial centers" of the carrier cards to define pivot axis 32*a*. Looseness in this ribbon accounts for the slight non-axial-alignment of these eyelets, and thus accounts for a slight visual imprecision in these figures regarding in the intended all-carrier "pivoted alignment" with axis 32*a*.

In terms of radial dimensions, background carrier 22*b* has the largest radial dimension, and foreground carrier 30*a* the smallest such dimension. This radial-dimensional differentiation especially allows for easy visibility of each of the individual carriers, and also offers the opportunity for the curving perimeter portions of the carriers, where these portions extend radially beyond the counterpart positions in the immediate foreground-neighbor carriers, to be decorated interestingly, such as with a rainbow of colors especially appealing to young learners.

In the condition of device 20 which is shown in FIG. 1, and as was suggested earlier herein, this device is shown here in what can be thought of as being a fully collapsed condition, with the respective foreground and background carriers in each pair of carriers lying angularly relative to one another with their radially extending edges (see the adjacent left and right sides of FIG. 1) substantially aligned. In this condition of these carriers, from which "fanning out" of the carriers will take place during use of the device, as will be explained, the outwardly projecting manipulation tabs associated with each pair of carriers are slightly angularly offset with respect to one another, as can clearly be seen in FIG. 1.

As was also mentioned earlier herein, the specific implementation of device 20 herein is aimed at teaching, inter alia, the correct pronunciations of the so-called short forms of the classically recognized five English vowels. With this in mind, suitably printed on the respective, outwardly projecting tabs associated with the foreground carriers in each of the five pairs of carriers are two-letter presentations employing these vowels with the single concluding consonant "t" to show immediately to a young learner an associative use of the vowel with a consonant in a setting where the vowel's short-form pronunciation is the correct pronunciation. These foreground tab markings also reflect, for the respective, associated pairs of carriers, the specific, single, partial-learning-element units which fixedly associated with the foreground carriers in those associated pairs of carriers. In other words, in the embodiment of the invention now being described, each foreground carrier has been designed to be associated with, and thus to carry, a single partial-learning-element unit.

Accordingly, and as illustrated for device 20, the single, partial-learning-element units, also referred to herein as first-category, readable word-ending word fragments, all ending with a common consonant, and associated respectively with foreground carriers 22*a*, 24*a*, 26*a*, 28*a* and 30*a*, are "at","et", "ot","it" and "ut". Not only are these single, partial-learning element units printed on the tabs associated with the just-mentioned foreground carriers, they are also printed radially inwardly on the faces of the foreground carriers, immediately to one side of a single rectangular aperture, or window, which is provided for exposing what is referred to herein as a pre-defined path of exposure—an arc of a circle—associated with the relevant background carrier. These apertured foreground carriers, as will be seen, act as shutters with respect to their associated background carriers.

Figure 4:
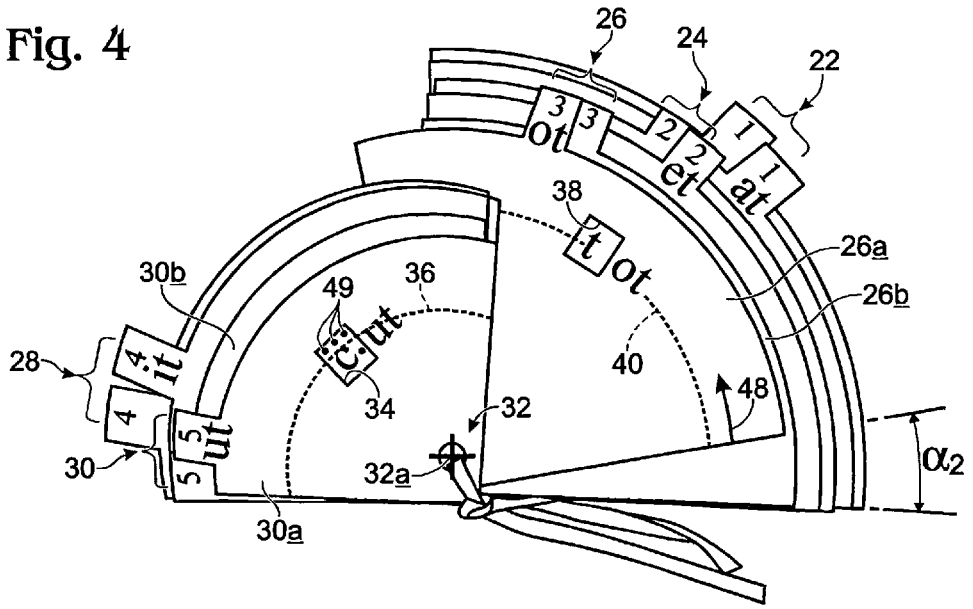
Figure 7:
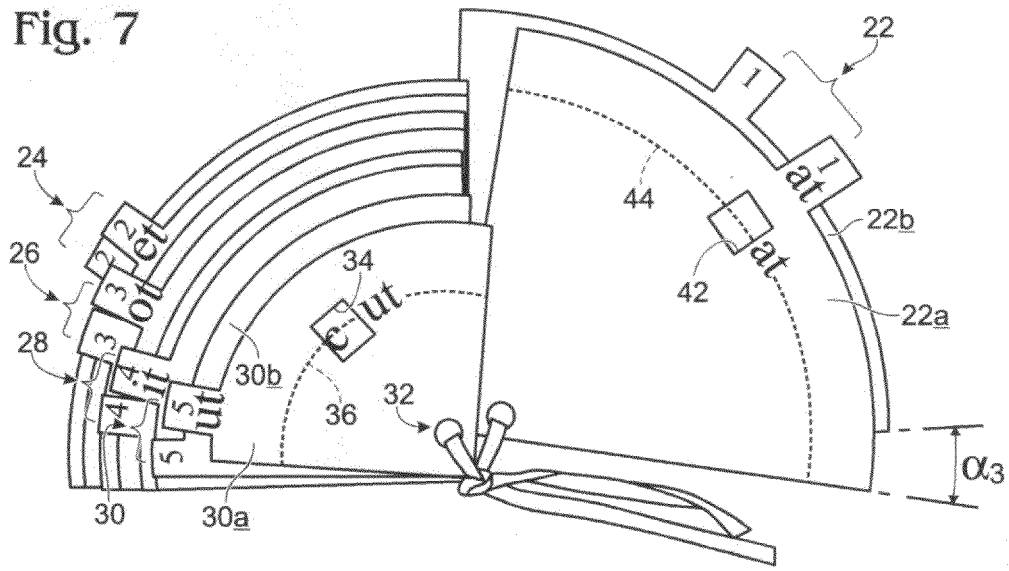
Figure 8:
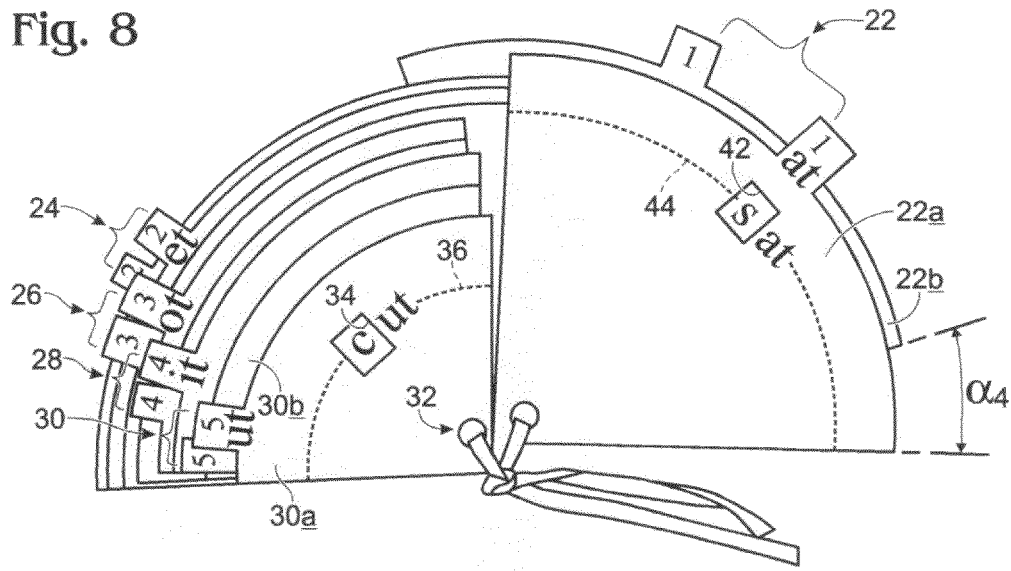

In each of FIGS. 1-8, inclusive, herein, such an aperture, or window, is shown at 34 in foreground carrier 30*a*. Window 34 is associated with a predefined path of exposure 36 which exists on, and in the association with, background carrier 30*b*. In FIG. 2, a similar aperture 38 is shown in foreground carrier 26*a*, which aperture is associated with a predefined path of exposure 40 existing on, and in association with, background carrier 26*b*. Aperture 38 and path 40 are also seen in FIGS. 3 and 4. In FIG. 5, relative rotational shifting has taken place between foreground carrier 26*a* and background carrier 26*b* in a manner whereby substantially the entirety of path 40 is made visible. In FIGS. 6, 7 and 8, a similar co-associated aperture 42 and predefined path of exposure 44 are illustrated for foreground and background carriers 22*a*, 22*b*, respectively.

It should be understood that these mentioned predefined paths of exposure, which form approximate 90° arcs of a circle in device 20 herein, are not actually visibly presented as such on the faces of the five background carriers. Rather, they define arcuate lines along which other elements of the invention are located, as will now be described.

Accordingly, provided in spaced relationship on and along each of the predefined paths of exposure invisibly formed on and with respect to the several background carriers, there is a distribution of spaced consonants which may be made to appear in the associated foreground-carrier windows. These distributed consonants are also referred to herein both as partial-learning-element units, and as second-category, readable, word-beginning word fragments. In each of FIGS. 1-8, inclusive, the relative angular positions which exist between foreground and background carriers 30*a*, 30*b*, respectively, are such that the consonant "c", which is included along path 36 on background carrier 30*b*, appears through window 34 in foreground carrier 30*a* to form, visually and selectively, with the letters "ut", the three-letter word "cut" which is referred to herein as a full-word, full-learning element, and also as a complete, short-vowel-sound word. This full-learning element is thus brought into visual being by the selective juxtaposition of two partial-learning-element units through rotational relative manual manipulation of carriers 30*a*, 30*b*.

In FIG. 2, the consonant "h", which is positioned on background carrier 26*b* along path 40, is seen to appear through window 38 in foreground carrier 26*a* to form the three-letter letter word "hot" (a full-learning element) with the letters "ot" which appear on foreground carrier 26*a* immediately next to window 38.

Turning attention for a moment specifically to FIGS. 3 and 4, in FIG. 3, foreground carrier 26*a* is seen to have been adjusted counter-clockwise relative to background carrier 26*b* through an angle $\alpha_1$ in the direction of arrow 46, and specifically so adjusted in such a fashion that nothing appears, that is, no consonant (partial-learning-element unit) appears, through window 38. Put another way, the next paired juxta-position of two partial-learning-element units which will occur with continued counter-clockwise adjustment of foreground carrier 26a is not pre-evident in the condition of things shown in FIG. 3. In FIG. 4, with further counter-clockwise shifting of foreground carrier 26*a* relative to background carrier 26*b*, as indicated by arrow 48, an angular displacement $\alpha_2$ has been created between these foreground and background carriers. In this new angular displacement between these two carriers, the consonant "t" which is included on and along path 40, now appears through window 38 to form another three-letter word "tot" with the letters "ot" which appear on foreground carrier 26*a*.

One can thus see, by looking at the sequence of positions thus illustrated for carriers 26*a*, 26*b*, that, as these two carrier have been shifted relative to one another, the particular full-learning element word which appears in device 20 has changed from "hot" to "tot", with the change "passing through" a condition (FIG. 3) wherein no background consonant along path 40 appears through window 38.

FIG. 5 in the drawings has been prepared, as previously mentioned, to show substantially the entirety of path 40 which is associated with background carrier 26b. In this figure, one can see that spatially distributed along path 40 are seven different consonants which can be made to appear in foreground window 38 to form several different words with the letters "ot" carried on foreground carrier 26a.

A similar sequence of full-learning element formations is illustrated in FIGS. 6-8, inclusive, with respect to there-illustrated clockwise shifting of foreground carrier 22a relative to background carrier 22b. In FIG. 6 the relative angular disposition of carriers 22a, 22b is such that the consonant "m" lying along path 44 is exposed through window 42 to form the word "mat" along with the partial-learning-element unit which appears immediately next to window 42 in carrier 22a. In FIG. 7 shifting has taken place to create an angular displacement $\alpha_3$ between carriers 22a, 22b, and in this circumstance, no background consonant appears in window 42. In FIG. 8, an angular displacement $\alpha_4$ has been created between carriers 22a, 22b, and in this condition of these two carriers, the background consonant "s" which lies along path 44 appears in window 42 to form the word "sat" along with the partial-learning-element "at".

One can thus see that, with device 20 constructed as described herein, there are five different pairs of cooperatively associated, relatively shiftable foreground and background carriers pivoted for swinging relative to one another to create different conditions of foreground and background alignment, whereby letters appear through aperture windows to form words based upon the vowels associated with the carriers. With regard to manipulations performed between two, associated, foreground and background carriers, only a single background-carrier consonant appears at any given time to combine with machine-associated foreground carrier letters. This behavior of device 20 is what produces the above-mentioned condition of non-pre-evidence associated with relative shifting of associated carriers between successive conditions of paired juxtaposition of two partial-learning-element units.

There is thus a certain element of surprise and mystery offered by device 20 with regard to what will next appear as a fully formed word. Learning device 20 also offers elements of entertainment as the various carriers are adjusted relative to one another. While it is not necessary that a device generally formed like device 20 should have carriers that have different respective radial dimensions (in a pivoted-carrier situation), such radial differentiation, as mentioned earlier herein, offers the opportunity to decorate the surfaces of the various carriers in numerous ways, for example in a rainbow of colors, to present a young learner with a very visually-appealing device for manipulation.

Still another possibility for the learning device of this invention, and thinking in terms of what has already been described with respect to FIGS. 1-8, inclusive, partial-learning-element units could be constructed to teach, for example, words in presented Braille. This possibility is indicated generally as a pattern of dots 49 in FIG. 4.

Figure 9:
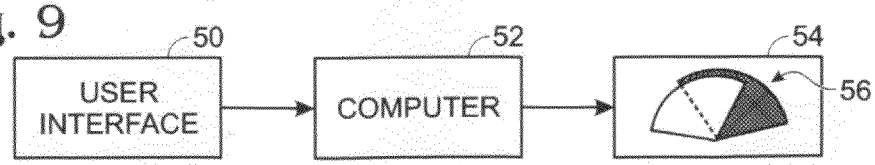
FIG. 9 is a simplified, high-level, block/schematic diagram generally illustrating an electronic, computer-based implementation of the invention.

It will be understood that, while the invention has been described so far herein in the context of a manually-manipulable mechanical device, a modified embodiment of the invention could just as well be implemented in the realm of a digital computer, wherein a manually-manipulable virtual device, visually somewhat like device 20, could be presented on a computer-driven display screen, with a young learner provided an opportunity to manipulate and adjust this device through an appropriate user interface, such as a mouse, a keyboard, and/or a joystick. FIG. 9 in the drawings, in three blocks 50, 52, 54, illustrates this possibility. Block 50 represents an appropriate user interface for manipulating the operation of a digital computer therein (block 52), which computer drives the virtual operation on a display screen (block 54) of a hinged, virtual learning device (like device 20) shown generally at 56 in FIG. 9. Virtual learning device 56 is what is referred to herein as a virtual screen-display image, and also as a moving-parts computer display. Although not specifically shown in FIG. 9, plural-carrier virtual image 56 contains appropriate visual representations of partial-learning-element units which can be juxtaposed to create full-learning elements.

The system of the invention is thus fully illustrated and described. This unique system is designed for teaching plural, different, selected, short-vowel sounds, per se, in the context of associated short-vowel-sound words which, correctly spoken, present those sounds includes (a) for each, selected, short-vowel sound, an associated and dedicated pair of operatively connected, relatively rotatable, word-fragment carriers, which carriers include (1) a foreground carrier carrying but a single, first-category, readable, word-ending word fragment having within it the vowel whose short-vowel sound is associated with the carrier pair, (2) a window disposed in the foreground carrier adjacent the carried, first-category word fragment, and (3) a background carrier which carries a plurality of second-category, readable, word-beginning word fragments each dedicated to working in teaching cooperation with the single, word-ending word fragment which is carried on the associated foreground carrier, and each displayable, via selected, relative-rotation, relative angular positioning of the two carriers in the pair, and one only at a time, through the foreground carrier window to combine readably with the associated, first-category word fragment to form therewith a complete, short-vowel-sound word which is correctly pronounceable utilizing the associated short-vowel sound.

Those skilled in the art will recognize that there are many variations and modifications which may be made in the specific details of implementation of both the structure and the methodology of this invention. We intend that all such variations and modifications will come within the scope of the now-following claims to invention.

We claim:

1. A structural, instrumentality-based system for presenting and teaching, exclusively, plural, different, selected, short-vowel sounds in the context only of associated short-vowel-sound words which, correctly spoken, present, in terms of vowel sounds, solely those sounds, said system comprising for each, selected, short-vowel sound, an associated and dedicated, foreground/background pair of operatively connected, relatively rotatable, word-fragment carriers, committed, and limited, to the teaching of the short-vowel sound of but a single vowel, and including a foreground carrier carrying but, and limited to, a single, first-category, readable, word-ending word fragment having, under all circumstances as the first letter within it, the single vowel whose short-vowel sound is associated with the carrier pair, a window disposed in said foreground carrier adjacent, and readably to the left only of, said first-category word fragment, sized to reveal, at any given time, but a single, background-carrier consonant, and a background carrier which carries a plurality of second-category, individually-window displayable, single-consonant-only, readable, word-beginning word fragments each dedicated to working in juxtaposed, proper-word teaching cooperation with the single, word-ending, word-fragment which is carried on the associated foreground carrier, and each displayable, via selected, relative-rotation, relative angular positioning of the two carriers in the pair, and one only at a time, through said window, to combine readably with said first-category word-fragment to form therewith a complete, proper, short-vowel-sound-only word which is correctly pronounceable utilizing the associated short-vowel sound, said paired and associated foreground and background carriers, and their respectively carried word fragments, each being constructed whereby every window-revealed background-carrier word-fragment in relation to every thereby cooperatively created combination of associated foreground-carrier and background-carrier word fragments, forms, with the juxtaposed foreground-carrier word fragment, a proper, short-vowel-sound word.

2. The system of claim 1 which is implemented in a manual, mechanical device.

3. The system of claim 1 which is implemented in a computer.

4. The system of claim 1, which is structured with all word-ending word fragments in each foreground carrier ending with the same, common consonant.

\* \* \* \* \*